United States Patent
Park

(10) Patent No.: US 7,986,975 B2
(45) Date of Patent: Jul. 26, 2011

(54) MOBILE TERMINAL AND METHOD OF PLAYING A VIDEO FROM A WEBSITE

(75) Inventor: Yeon-Woo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 626 days.

(21) Appl. No.: 12/034,184

(22) Filed: Feb. 20, 2008

(65) Prior Publication Data

US 2008/0220822 A1    Sep. 11, 2008

(30) Foreign Application Priority Data

Mar. 7, 2007  (KR) .................. 10-2007-0022513

(51) Int. Cl.
*H04B 1/38* (2006.01)
(52) U.S. Cl. ...................... 455/566; 455/3.06
(58) Field of Classification Search .................. 455/566; 345/156, 169, 174
See application file for complete search history.

(56) References Cited

U.S. PATENT DOCUMENTS

| | | | |
|---|---|---|---|
| 2006/0031886 A1* | 2/2006 | Bae et al. ................. | 725/62 |
| 2006/0258289 A1* | 11/2006 | Dua ........................ | 455/41.3 |
| 2007/0191070 A1* | 8/2007 | Rao ........................ | 455/566 |
| 2007/0254696 A1* | 11/2007 | Kajitani ................ | 455/556.1 |
| 2008/0184116 A1* | 7/2008 | Error ...................... | 715/704 |

FOREIGN PATENT DOCUMENTS

| | | |
|---|---|---|
| CN | 1471794 | 1/2004 |
| CN | 1812523 | 8/2006 |
| CN | 1909651 | 2/2007 |

* cited by examiner

*Primary Examiner* — Tu Nguyen
(74) *Attorney, Agent, or Firm* — Lee, Hong, Degerman, Kang & Waimey

(57) ABSTRACT

A method for displaying video on a mobile terminal that includes a display defined by a user area and an information area includes displaying a list of videos available for playing within the user area, selecting one video from the list of videos, automatically playing and displaying the selected video on the display in a display region that substantially utilizes all of the user area.

56 Claims, 8 Drawing Sheets

MOBILE TERMINAL AND METHOD OF PLAYING A VIDEO FROM A WEBSITE

CROSS-REFERENCE TO RELATED APPLICATIONS

This nonprovisional application claims priority under 35 U.S.C. §119 a on Patent Application No. 10-2007-0022513 filed in Republic of Korea on Mar. 7, 2007 the entire contents of which are hereby incorporated by reference.

BACKGROUND OF THE INVENTION

1. Field of the Invention

The present invention relates to a mobile terminal and a method of playing videos from a website.

2. Discussion of the Related Art

A conventional mobile terminal may play videos from a website providing videos. A user may view the videos through a web browser in the mobile terminal.

However, a video play screen provided by a website is limited in size, and is inconvenient for viewing purposes. Specifically, a user may not be able to properly view the video when a video is played in a play screen set by a website if a mobile terminal has a small screen. The small play screen size adds to the user's inconvenience.

Through the proliferation of websites which provide videos and allow users to upload user created content, such as YouTube, Break, and Google Video, there is a need to enable users to conveniently view videos provided by a website.

SUMMARY OF THE INVENTION

An object of this document is to provide a mobile terminal and a method of playing videos in a website using the same, capable of playing videos provided by a website in a play screen size different from its original size.

In accordance with an embodiment, a method for displaying video on a mobile terminal that includes a display defined by a user area and an information area is provided. The method includes displaying a list of videos available for playing within the user area, selecting one video from the list of videos, and automatically playing and displaying the selected video on the display in a display region that substantially utilizes all of the user area.

In one feature, the display region substantially utilizes all of the user area and substantially all of the information area of the display. the information area comprises a first region located at the top of the display and a second region located at the bottom of the display, the first region displaying at least one of a power indicator, a time, and a signal strength of the mobile terminal and the second region displaying at least one of a button associated with a function of the mobile terminal.

In another feature, the user area and the information area utilize of all the available display area. Additionally, the user area utilizes the information area when a video is displayed.

In yet another feature, the video is executed by selecting an identifier associated with the video. Additionally, the video is selected by selecting a region where the video is displayed.

In still yet another feature, the display is further defined by a second user area. The second user area is utilized to perform functions associated with the mobile terminal. Additionally, the display region may have a landscape orientation.

In yet another feature, the method further includes selectively terminating display of the selected video on the display at the display region, maintaining audio associated with the selected video, and displaying other content at the display region after the terminating display of the selected video.

In one embodiment, a method for displaying video on a mobile terminal that includes a display defined by a user area and an information area is provided. The method includes displaying a web browser within the user area, the web browser displaying a list of videos available for playing, selecting one video from the list of videos, and automatically playing and displaying the selected video on the display in a display region that substantially utilizes all of the web browser displayed in the user area.

In accordance to another embodiment, a mobile terminal includes a display for displaying information, a communication module for communicating with an Internet, an input unit for receiving input from a user, a memory unit for storing data associated with the mobile terminal, and a controller for controlling the communication module to enter a web page providing one or more videos and controlling the display to play and display the selected video in a play screen having a size larger than an original size provided by the website.

BRIEF DESCRIPTION OF THE DRAWINGS

The implementation of this document will be described in detail with reference to the following drawings in which like numerals refer to like elements.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
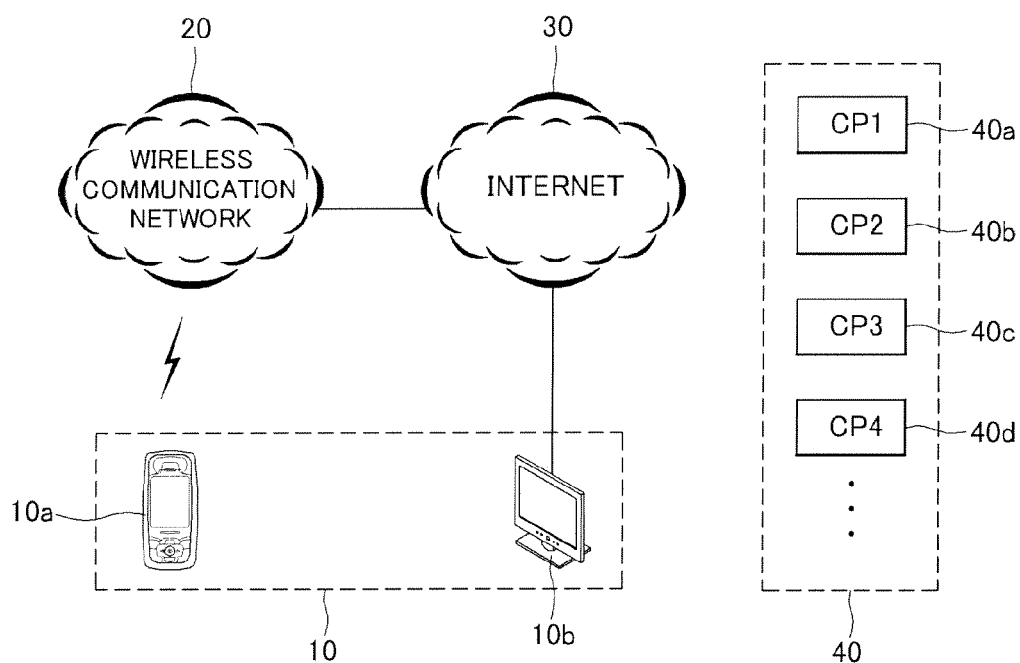
FIG. 1 is a schematic diagram of a system according to the present invention.

FIG. 1 is a schematic diagram of a system according to the present invention. As illustrated in FIG. 1, the system includes a terminal 10, a wireless communication network 20, an Internet 30, and at least one content providing server 40.

The terminal 10 may include various types of mobile terminals that may communicate with a wired or wireless Internet. For example, the terminal 10 may include a mobile terminal 10a which may communicate with the wireless communication network 20 which is connected to the Internet 30, and a computer 10b which communicates with the Internet.

The content providing servers 40a, 40b, 40c, and 40d may include websites with different Internet addresses. Each website may include a website which provides at least one video.

Figure 2:
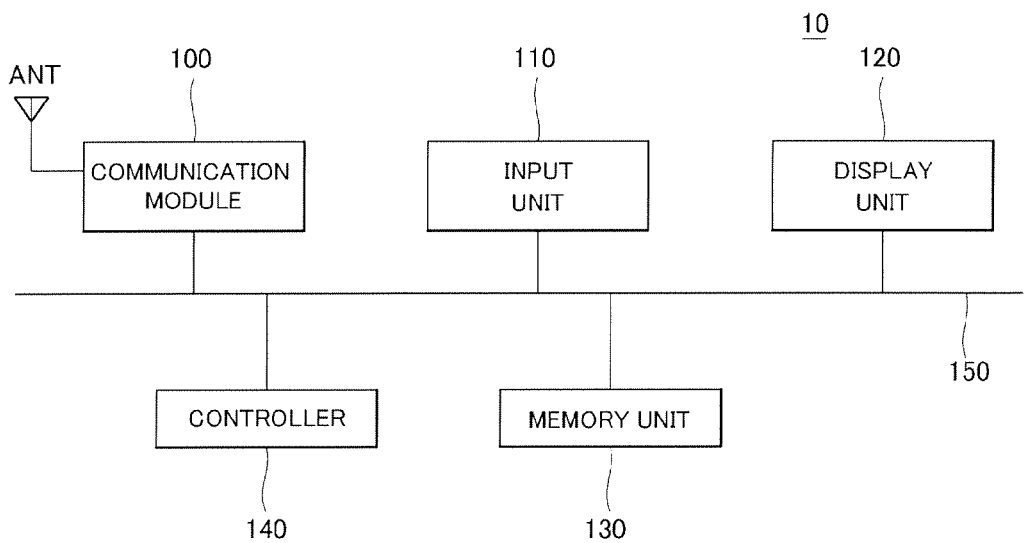
FIG. 2 is a block diagram of a mobile terminal comprising a video play function according to the present invention.

FIG. 2 is a block diagram of a mobile terminal including a video play function for a website according to the present invention. It is assumed that the terminal 10 is the mobile terminal 10a.

The mobile terminal 10a may include a communication module 100, an input unit 110, a display unit 120, a memory unit 130, and a controller 140. The respective elements may be connected by a bus 150.

The communication module 100 is adapted to transmit and receive data to and from the wireless communication network 20. As described above, the wireless communication network 20 is connected to the Internet 30. The communication module 100 may communicate with the Internet 30 through the wireless communication network 20. The communication module 100 may also communicate with the computer 10b through a wired connection in order to communicate with the Internet 30.

The input unit 110 is adapted to receive various information and commands from a user. The input unit 110 may be implemented by a keypad or a touch screen equipped with a variety of numeric keys and direction keys.

The display unit 120 is adapted to display the status or information of the mobile terminal 10a in response to a control signal output from the controller 140.

The memory unit 130 stores a program for controlling overall operation of the mobile terminal 10a. The controller 140 is adapted to control the overall operation of the mobile terminal 10a. The memory unit 130 also stores data which is processed when the controller 140 executes the overall operation of the mobile terminal 10a.

Specifically, the memory unit 130 may store a web browser used to access a website that includes a video. A web browser is an application that allows a user to view information, retrieved from the content providing server 40 by a mobile terminal 10a that is connected to the Internet 30.

Figure 3:
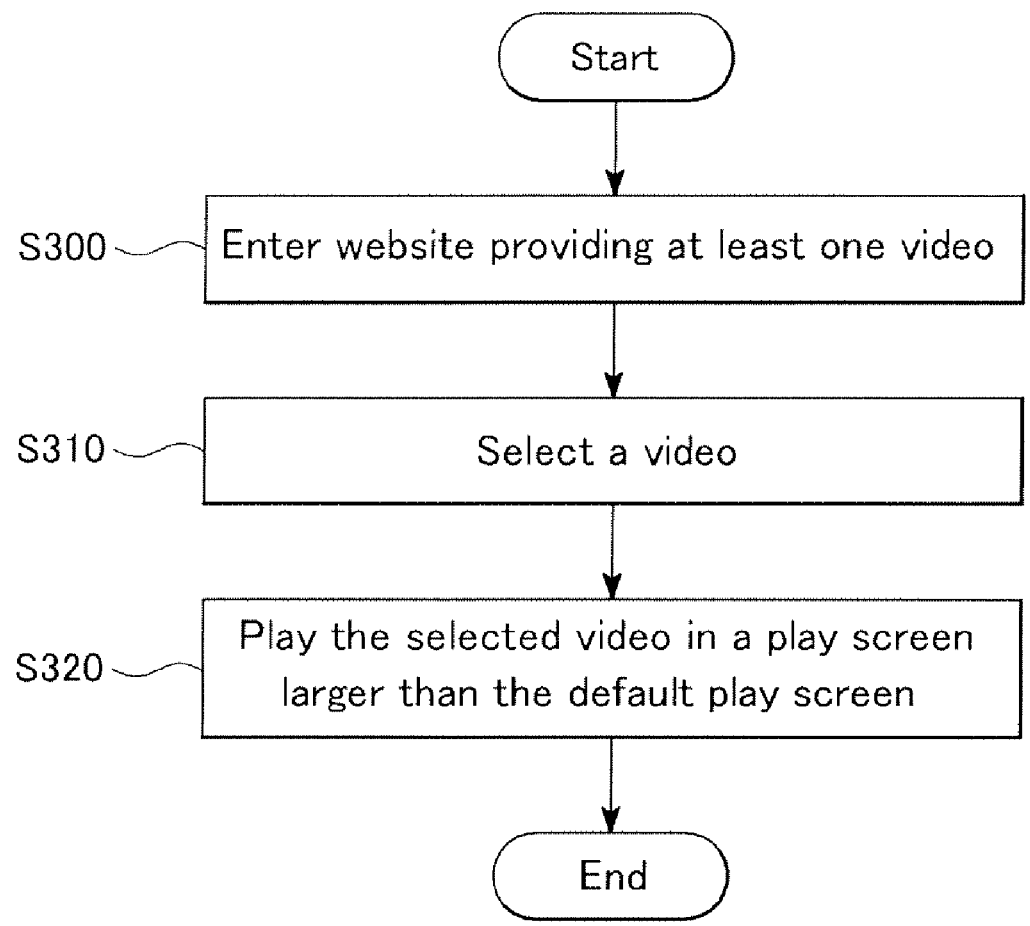
FIG. 3 is a flowchart illustrating a method of playing videos from a website according to the present invention.

FIG. 3 is a flowchart illustrating a method of playing videos of a website according to an embodiment of the present invention. An operation of the mobile terminal 10a having a video play function for playing videos from a website according to the present invention will be described in detail with reference to FIGS. 1 to 3.

First, a website providing at least one video is entered (S300). For example, the controller 140 may access one of the plurality of content providing servers 40 that provide videos through the communication module 100.

Figure 4:
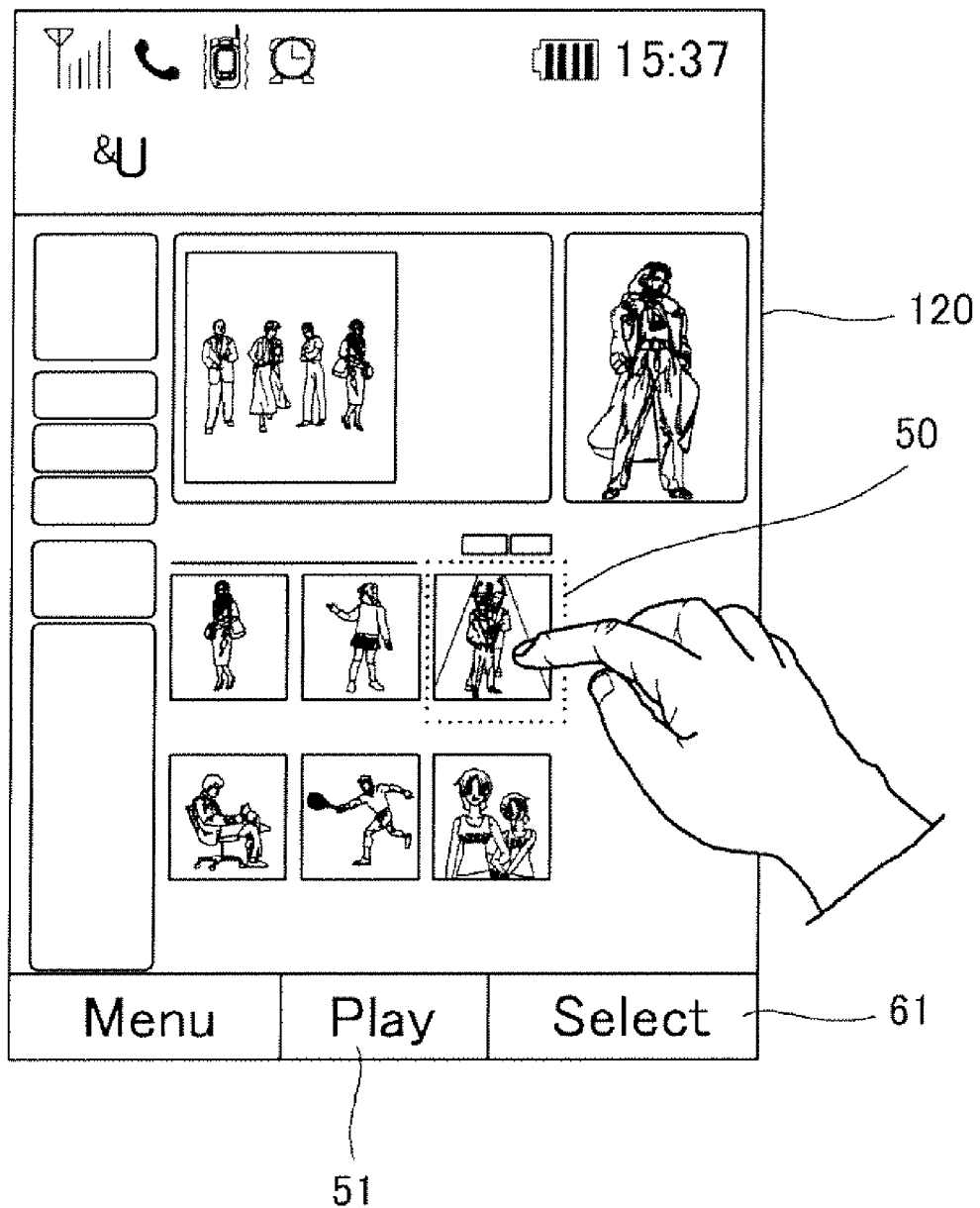
FIG. 4 is a view illustrating an example of a screen that has entered a website providing videos according to the present invention.

The web browser stored in the memory unit 130 may be utilized as a user interface when the controller 140 has accessed a server. FIG. 4 illustrates an example of a screen of an accessed website that provides videos according to the present invention.

A video must be selected (S310) in order to play one or more of the videos provided by the website that has been accessed in step S300. The controller 140 plays the selected video with a screen size larger than the original size provided by the website (S320).

The display unit 120 may be implemented with a touch screen. A video may be selected by touching an identifier that identifies the video or a region in which the video is displayed (S310). The identifier and the region are displayed on the touch screen.

Figure 5:
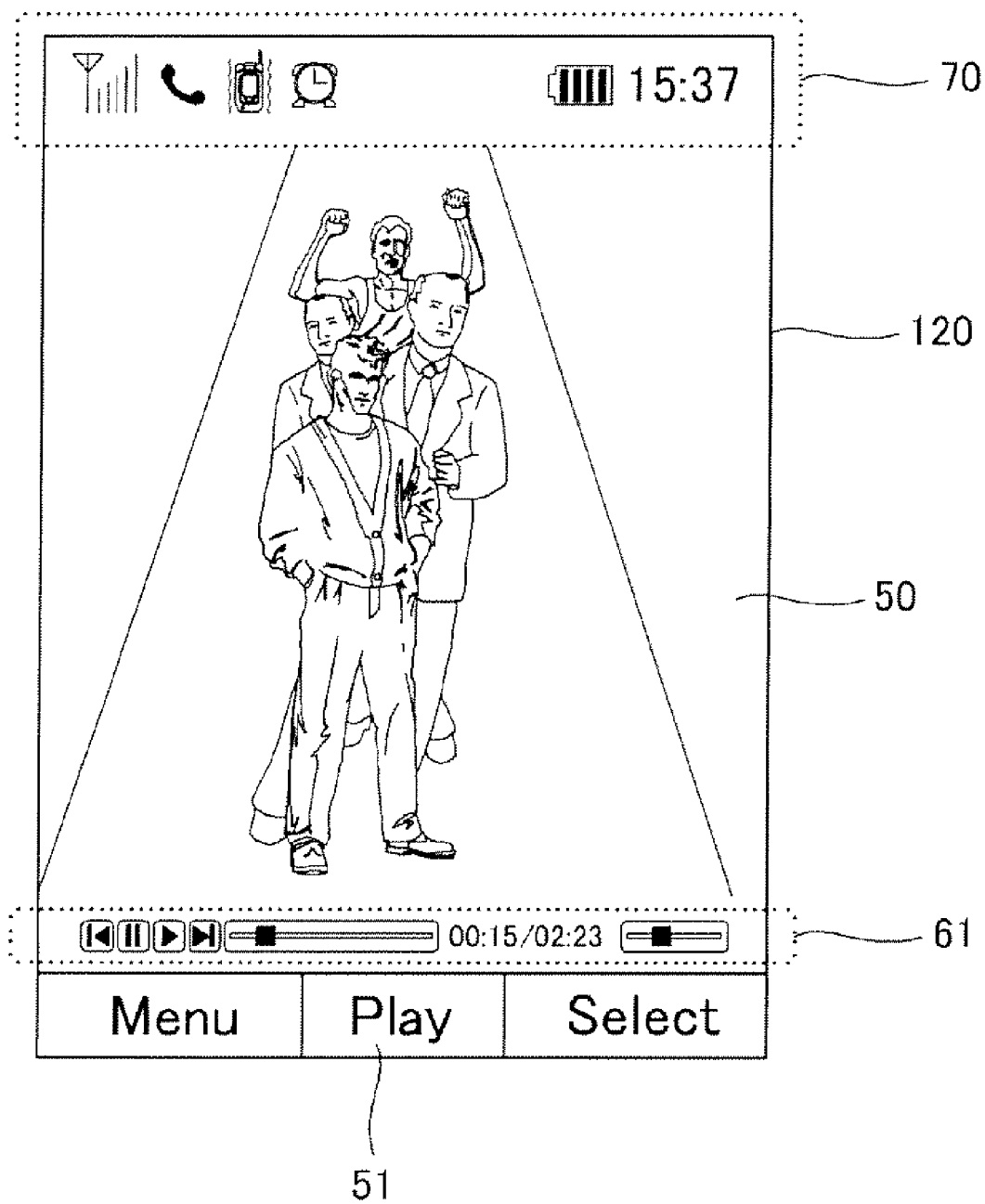
FIG. 5 is a view illustrating an example of a video played on the entire screen of a display according to the present invention.

For example, as shown in FIG. 5, a user may select the video by touching a region 50. The identifier of the video may include a video title linked to the video.

Figure 6:
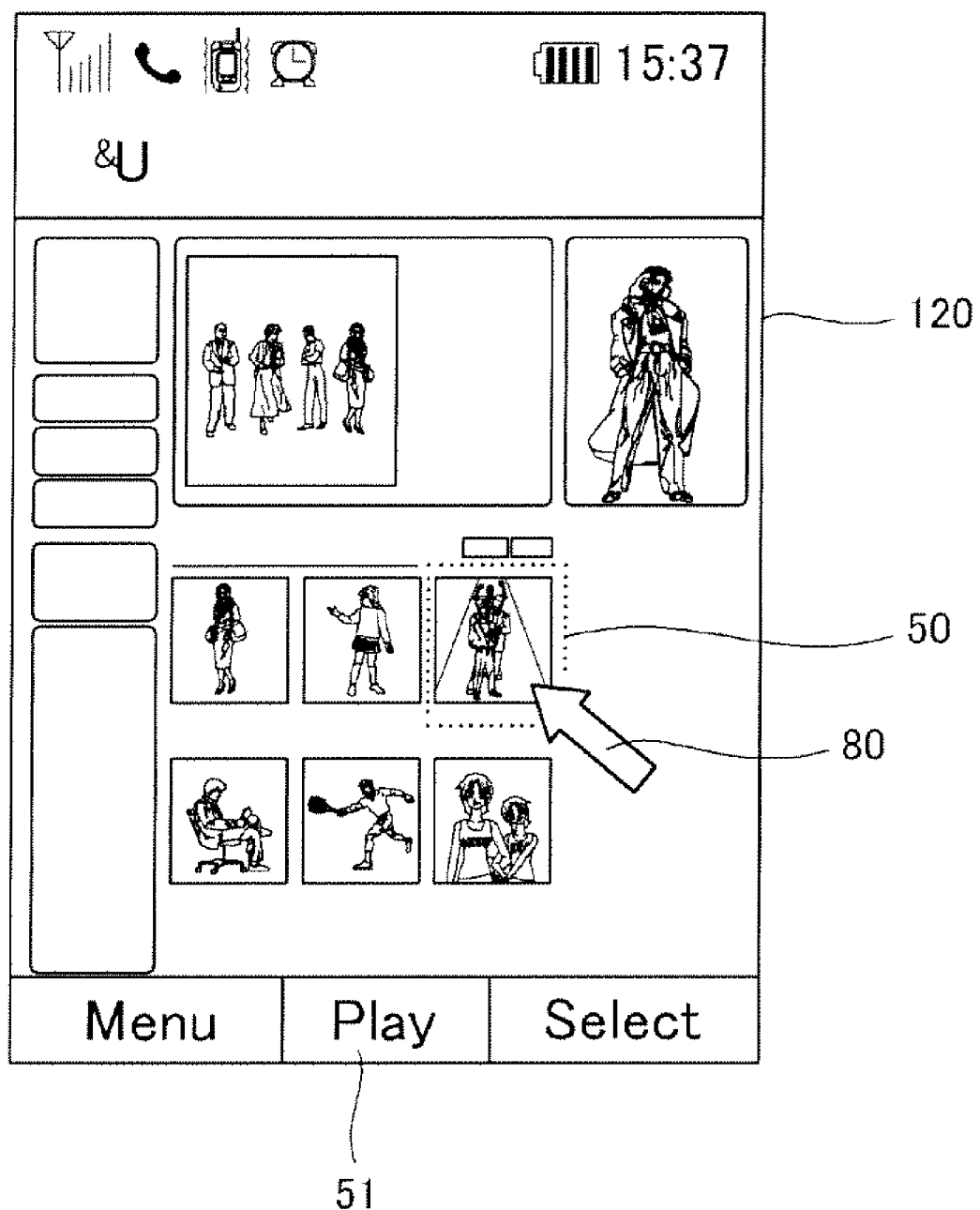
FIG. 6 is a view illustrating an example of a screen on which an indicator for selecting a video is displayed according to the present invention.

Furthermore, the video may be selected when an indicator 80 displayed on the display unit 120 moves to an identifier of a video or a region in which the video is displayed (S310). FIG. 6 illustrates an example of a screen which displays an indicator 80 for selecting a video. As shown in FIG. 6, a specific video is selected, when the indicator 80 moves to the region 50 on the display unit 120.

The indicator 80 may be moved by a direction key included in the mobile terminal 10a. Alternatively, the indicator 80 may be moved by a touch-and-drag method, if the display unit 120 is implemented with a touch screen.

The term "play screen size larger than its original size" refers to a play screen size larger than the default size of the website. In the prior art, the selected video was played with a play screen having a size previously set by the website. The size of the play screen that is larger than the default size may vary.

For example, the selected video may be played as the entire screen of the display unit 120 (S320). When a video is selected, the controller 140 may control the selected video such that it is played as the entire screen of the display unit 120 or played as the entire screen of the web browser.

FIG. 5 illustrates an example of a video played on the entire screen of the display unit 120 according to an embodiment of the present invention. Referring to FIG. 5, the entire screen may include the entire viewable area of the display unit 120.

FIG. 5 also shows a region 70 for displaying supplementary information about the status of the mobile terminal 10a. The region 70 may disappear when a video is played as the entire screen. Additionally, the entire screen of the display unit 120 may have a landscape orientation (Not shown) as opposed to the portrait orientation shown in FIG. 5.

Figure 7A:
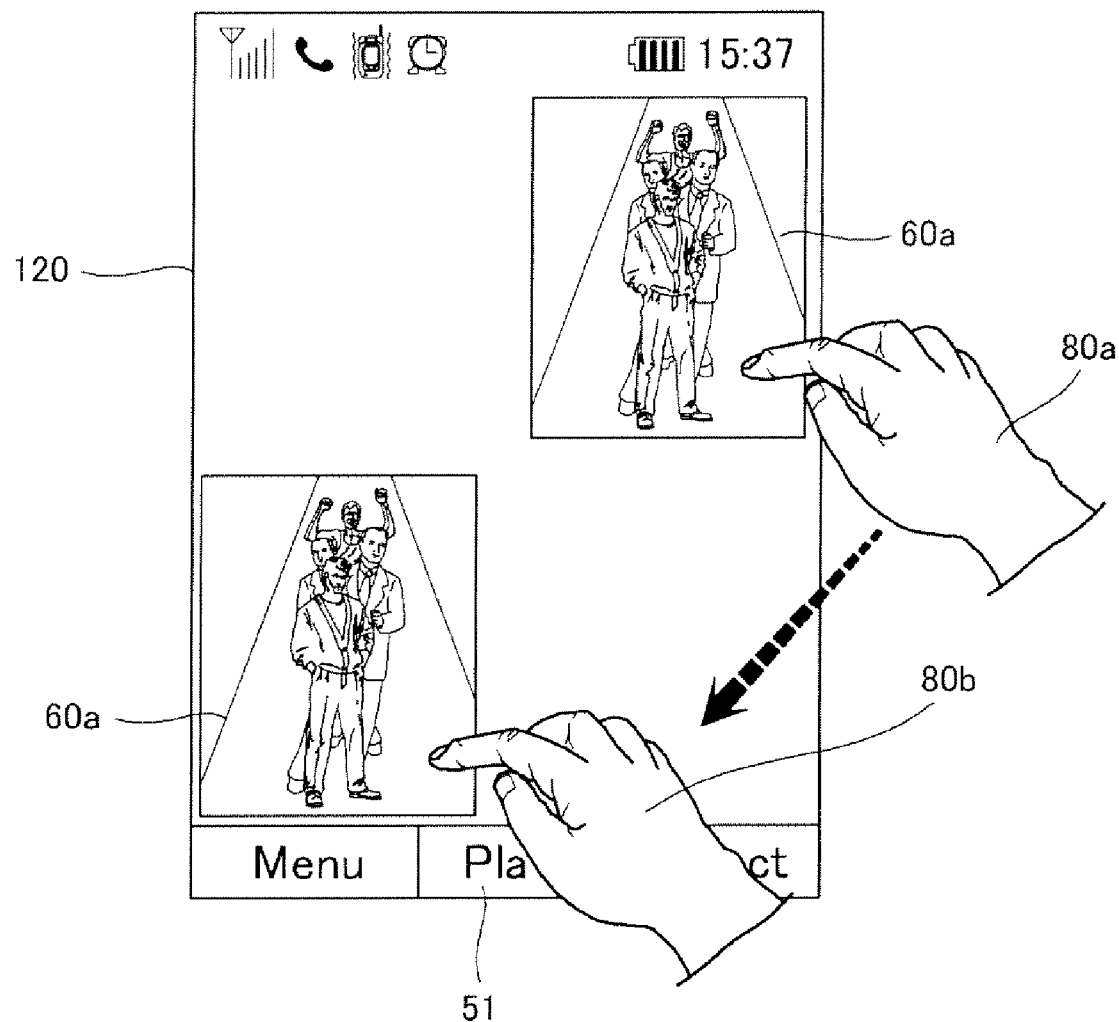
FIGS. 7A and 7B illustrate examples of videos played as the entire screen of a web browser according to the present invention.
Figure 7B:
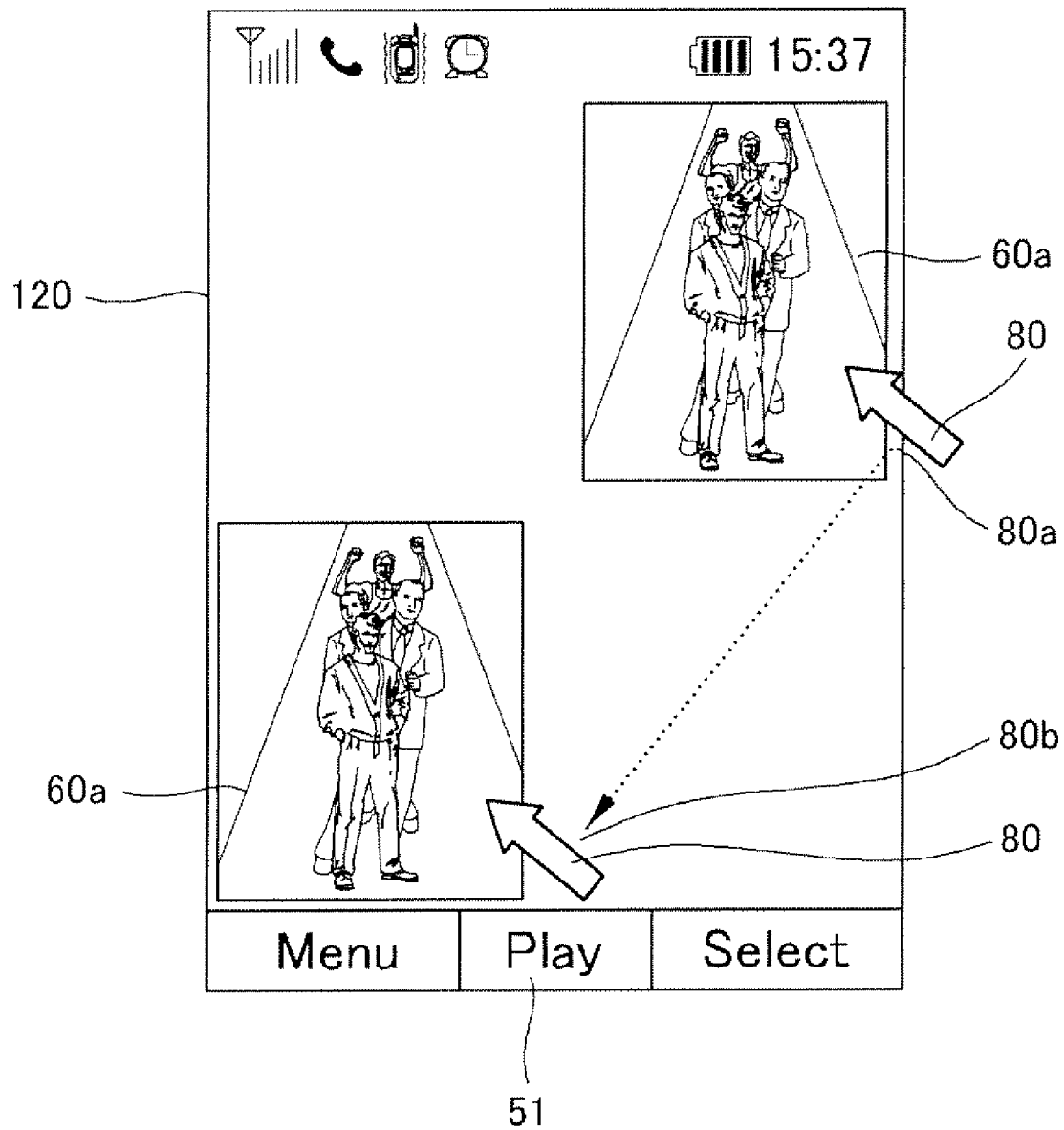

FIGS. 7A and 7B are views illustrating examples of videos played as the entire screen of a web browser. Referring to FIG. 7A, the entire screen may include a region allocated to the web browser in the display region of display unit 120 and the selected video may be played as the entire region 60a which is allocated to the web browser. Further, if the display unit 120 is implemented with a touch screen, the region 60a may be moved from a first location to a second location within the display region of the display unit 120 in response to user's touch-and-drag motion. As shown in FIG. 7a, the touch-and-drag operation is executed by movement of a user's finger from a first position 80a to a second position 80b.

Referring to FIG. 7B, the play screen may be moved in response to the movement of the indicator 80 on the display unit 120. In the example shown in FIG. 7B, the region 60a moves from a first location to a second location when the indicator 80 is moved from a position 80a to a position 80b. A user may move the indicator 80 using a direction key provided in the input unit 110 or by performing a touch-and-drag operation.

In one embodiment of the present invention, a second screen may be display on the display unit 120 while the selected video is played as the entire screen of the region 60a allocated to the web browser. The second screen may perform a function that does not include playing a video from a website such that the mobile terminal 10a supports a multi-tasking function.

Figure 8:
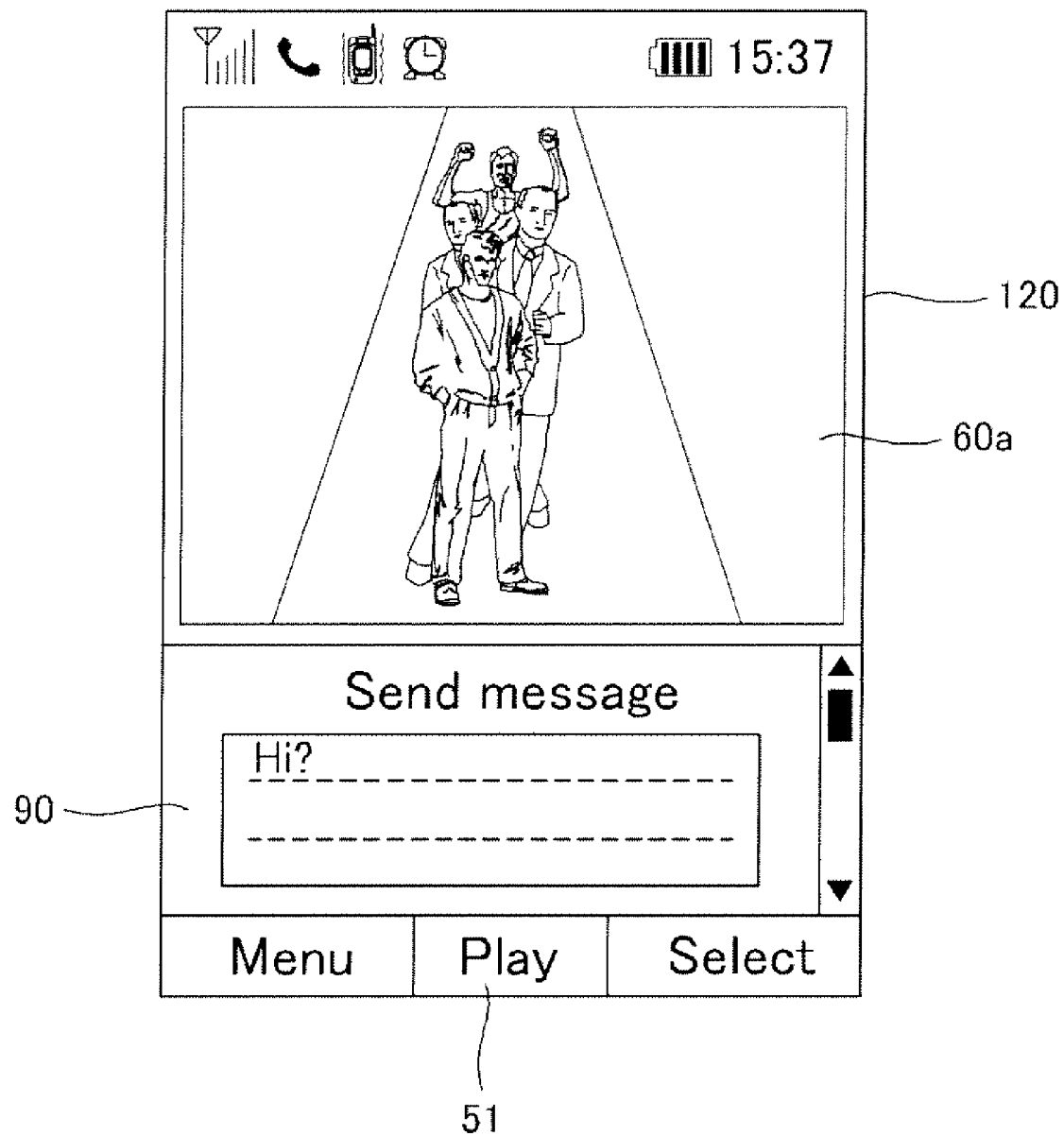
FIG. 8 illustrates an example of a multi-tasking function of a mobile terminal according to the present invention.

For example, referring to FIG. 8, a message input window 90 is displayed on the display unit 120 while the selected video is played as the entire screen of a region 60a allocated to a web browser. A user may input a message through the input unit 110 when the message input window 90 is displayed on the display unit 120. The message may be a Short Message Service (SMS) or Multimedia Message Service (MMS).

Additionally, the second screen may effectively terminate display of the selected video on the display unit 120 and display other content on the display unit. The audio associated with the selected video will continue to play through the mobile terminal 10*a* if the second screen terminates display of the selected video in order to display other content on the display unit 120. The second screen may display the other content on the entire display area of the display unit 120 or a selected region of the display unit.

A video may be played (S320) as soon as the specific video is selected (S310) or the video may be played when a play button for playing the selected video is selected. The play button may be displayed on the display unit 120 or may be provided by the input unit 110. A play button displayed on the display unit 120 may be provided by either a website or the mobile terminal 10*a*.

As shown in FIGS. 4 and 5, a play button 51 may be displayed on the display unit 120. A user may play the selected video by selecting the play button 51. A user may play the selected video by touching the play button 51 if the display unit 120 is implemented with a touch screen.

As shown in FIG. 5, a control region 61 for controlling the selected video may be displayed on the display unit 120. The control region 61 may be provided by a website or the mobile terminal 10*a* and may include the play button 51.

The mobile terminal 10*a* and the method of playing videos of a website in the mobile terminal described above according have several advantages. The present invention provides users with videos from a website with a play screen larger than an original screen set by the website.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for displaying video on a mobile terminal that includes a display defined by a user area and an information area, the method comprising:
    displaying a list of videos available for playing within the user area;
    selecting one video from the list of videos;
    automatically playing and displaying the selected video on the display in a display region that substantially utilizes all of the user area;
    selectively terminating display of the selected video on the display at the display region;
    maintaining audio associated with the selected video; and
    displaying other content at the display region after selectively terminating the display of the selected video.

2. The method according to claim 1, wherein the display region substantially utilizes all of the user area and substantially all of the information area of the display.

3. The method according to claim 1, wherein the information area comprises a first region located at the top of the display and a second region located at the bottom of the display, the first region displaying at least one of a power indicator, a time, and a signal strength of the mobile terminal and the second region displaying at least one of a button associated with a function of the mobile terminal.

4. The method according to claim 1, wherein the user area and the information area utilize all of the available display area.

5. The method according to claim 1, wherein the user area utilizes the information area when the video is displayed.

6. The method according to claim 1, wherein the video is executed when an identifier associated with the video is selected.

7. The method according to claim 1, wherein the video is selected by selecting a region where the video is displayed.

8. The method according to claim 1, wherein the display is further defined by a second user area.

9. The method according to claim 8, wherein the second user area is utilized to perform functions associated with the mobile terminal.

10. The method according to claim 1, wherein the display region has a landscape orientation.

11. The method according to claim 1, wherein at least the selected video or the other content is provided from a website or a server that is connected to the Internet.

12. The method according to claim 11, wherein the other content comprises a list of videos that is displayed via a web browser.

13. The method according to claim 1, wherein the display comprises a touch screen and the video is selected by touch input.

14. The method according to claim 1, wherein each of videos in the list of videos is displayed as an icon.

15. The method according to claim 14, wherein the icon comprises an image of a scene from the video.

16. The method according to claim 14, wherein each of the videos in the list of videos is further identified by a title.

17. The method according to claim 1, further comprising:
    displaying a second screen on the display while the selected video is played, the second screen performing a function other than playing of video.

18. The method according to 17, wherein the selected video is not displayed when other content is displayed on the second screen while audio associated with the selected video is continuously output.

19. The method according to claim 1, further comprising:
    displaying a video control menu when the selected video is played.

20. The method according to claim 19, wherein the video control menu is provided by a website providing the selected video.

21. The method according to claim 19, wherein the video control menu is provided by the mobile terminal.

22. The method according to claim 1, further comprising:
    displaying a message input window on the display while the selected video is played.

23. A method for displaying video on a mobile terminal that includes a display defined by a user area and an information area, the method comprising:
    displaying a web browser within the user area, the web browser displaying a list of videos available for playing;
    selecting one video from the list of videos;
    automatically playing and displaying the selected video on the display in a display region that substantially utilizes all of the web browser displayed in the user area; and
    displaying a second web browser on the display while the selected video is played, the second web browser performing a function other than playing a video,
    wherein the selected video is not displayed when other content is displayed on the second web browser while audio associated with the selected video is continuously output, wherein a region for displaying supplementary information related to the mobile terminal disappears when the selected video is displayed in the display region.

24. The method according to claim 23, wherein the web browser substantially utilizes all of the user area.

25. The method according to claim 23, wherein the web browser utilizes a portion of the user area.

26. The method according to claim 23, wherein the video is provided from a website or a server that is connected to the Internet.

27. The method according to claim 23, wherein the display comprises a touch screen and the video is selected by touch input.

28. The method according to claim 23, wherein each of videos in the list of videos is displayed as an icon.

29. The method according to claim 28, wherein the icon comprises an image of a scene from the video.

30. The method according to claim 28, wherein each of the videos in the list of videos is further identified by a title.

31. The method according to claim 23, further comprising:
displaying a video control menu when the selected video is played.

32. The method according to claim 31, wherein the video control menu is provided by a website providing the selected video.

33. The method according to claim 31, wherein the video control menu is provided by the mobile terminal.

34. The method according to claim 23, further comprising:
displaying a message input window on the display while the selected video is played.

35. A mobile terminal comprising:
a display for displaying information;
a communication module for communicating with an Internet;
an input unit for receiving input from a user;
a memory unit for storing data associated with the mobile terminal; and
a controller for controlling the communication module to enter a web page providing one or more videos and controlling the display to play and display the selected video in a play screen having a size larger than an original size provided by the web page,
wherein the controller further controls the display to display the selected video in the entire play screen,
wherein the controller further controls the display such that a region for displaying supplementary information related to the mobile terminal disappears when the selected video is displayed in the entire play screen, and
wherein the controller further controls the display to display a second screen while the selected video is played, the second screen performing a function other than playing a video, wherein the selected video is not displayed when other content is displayed on the second screen while audio associated with the selected video is continuously output.

36. The mobile terminal of claim 35, wherein the controller controls the display such that the selected video is displayed in an entire screen of a region allocated to a web browser providing the web page.

37. The mobile terminal of claim 35, wherein the controller controls the display such that the selected video is displayed in a first user area of the display and controls the display to display a second user area for performing a function of the mobile terminal.

38. The mobile terminal of claim 35, wherein the input unit comprises a touch screen.

39. The mobile terminal of claim 38, wherein the video is selected by touch input via the touch screen.

40. The mobile terminal of claim 35, wherein the input unit comprises a keypad.

41. The mobile terminal of claim 35, wherein the video is provided from a website or a server that is connected to the Internet.

42. The mobile terminal of claim 35, wherein the web page provides a list of videos and each of videos in the list of videos is displayed as an icon.

43. The mobile terminal of claim 42, wherein the icon comprises an image of a scene from the video.

44. The mobile terminal of claim 42, wherein each of the videos in the list of videos is further identified by a title.

45. The mobile terminal of claim 35, wherein the controller controls the display to display a video control menu when the selected video is played.

46. The mobile terminal of claim 45, wherein the video control menu is provided by a website providing the selected video.

47. The mobile terminal of claim 45, wherein the video control menu is provided by the mobile terminal.

48. The mobile terminal of claim 35, wherein the controller controls the display to display a message input window while the selected video is played.

49. A method for displaying video on a mobile terminal that includes a display defined by a user area and an information area, the method comprising:
displaying a list of videos available for playing within the user area;
selecting one video from the list of videos;
automatically playing and displaying the selected video on the display in a display region that substantially utilizes all of the user area;
selectively terminating display of the selected video on the display at the display region;
maintaining audio associated with the selected video; and
displaying other content at the display region after the terminating display of the selected video,
wherein a region for displaying supplementary information related to the mobile terminal disappears when the selected video is displayed in the display region.

50. The method according to claim 49, wherein the display region substantially utilizes all of the user area and substantially all of the information area of the display.

51. The method according to claim 49, wherein the information area comprises a first region located at the top of the display and a second region located at the bottom of the display, the first region displaying at least one of a power indicator, a time, and a signal strength of the mobile terminal and the second region displaying at least one of a button associated with a function of the mobile terminal.

52. A method for displaying video on a mobile terminal that includes a display defined by a user area and an information area, the method comprising:
displaying a web browser within the user area, the web browser displaying a list of videos available for playing;
selecting one video from the list of videos;
automatically playing and displaying the selected video on the display in a display region that substantially utilizes all of the web browser displayed in the user area;
selectively terminating display of the selected video on the display at the display region;
maintaining audio associated with the selected video; and
displaying other content at the display region after selectively terminating the display of the selected video.

53. The method according to claim 52, wherein the information area comprises a first region located at the top of the display and a second region located at the bottom of the display, the first region displaying at least one of a power indicator, a time, and a signal strength of the mobile terminal and the second region displaying at least one of a button associated with a function of the mobile terminal.

54. The method according to claim 52, further comprising:
selectively terminating display of the selected video on the display at the display region;
maintaining audio associated with the selected video; and
displaying other content at the display region after the terminating display of the selected video.

55. The method according to claim 52, wherein at least the selected video or the other content is provided from a website or a server that is connected to the Internet.

56. The method according to claim 55, wherein the other content comprises a list of videos that is displayed via a web browser

* * * * *